Dec. 2, 1947.  G. C. LAWRIE  2,432,022
BALANCING MACHINE
Filed Nov. 21, 1944  6 Sheets-Sheet 1

INVENTOR.
George C. Lawrie
BY
Herbert S. Fairbanks
ATTORNEY

Dec. 2, 1947.   G. C. LAWRIE   2,432,022
BALANCING MACHINE
Filed Nov. 21, 1944   6 Sheets-Sheet 3

Fig. 3.

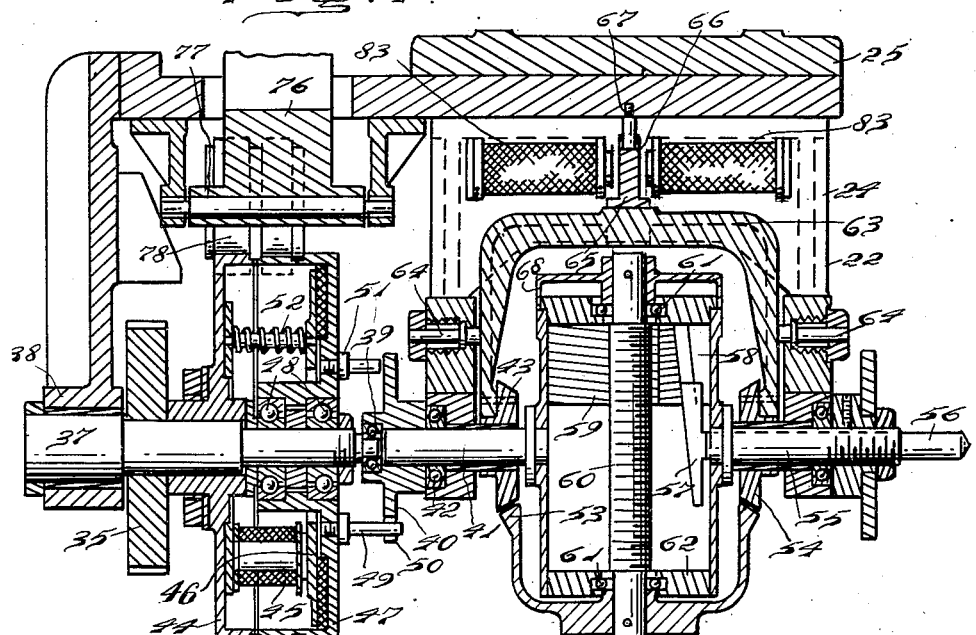
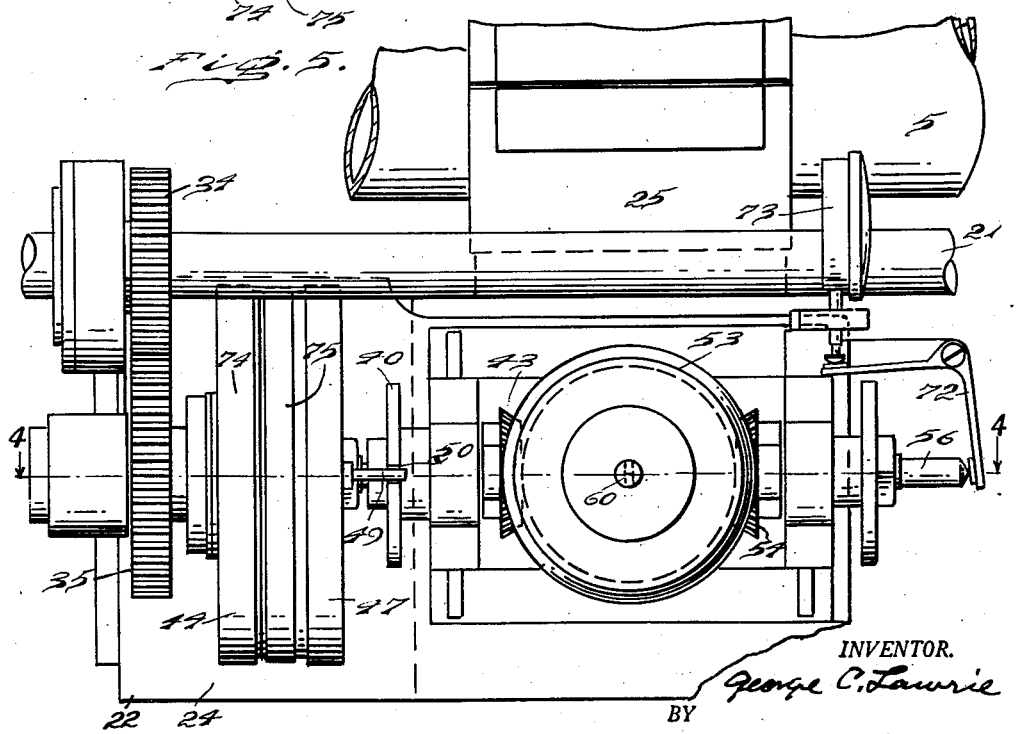

Dec. 2, 1947.  G. C. LAWRIE  2,432,022
BALANCING MACHINE
Filed Nov. 21, 1944  6 Sheets-Sheet 5

Fig. 6.

INVENTOR.
George C. Lawrie
BY
Herbert P. Fairbanks
ATTORNEY

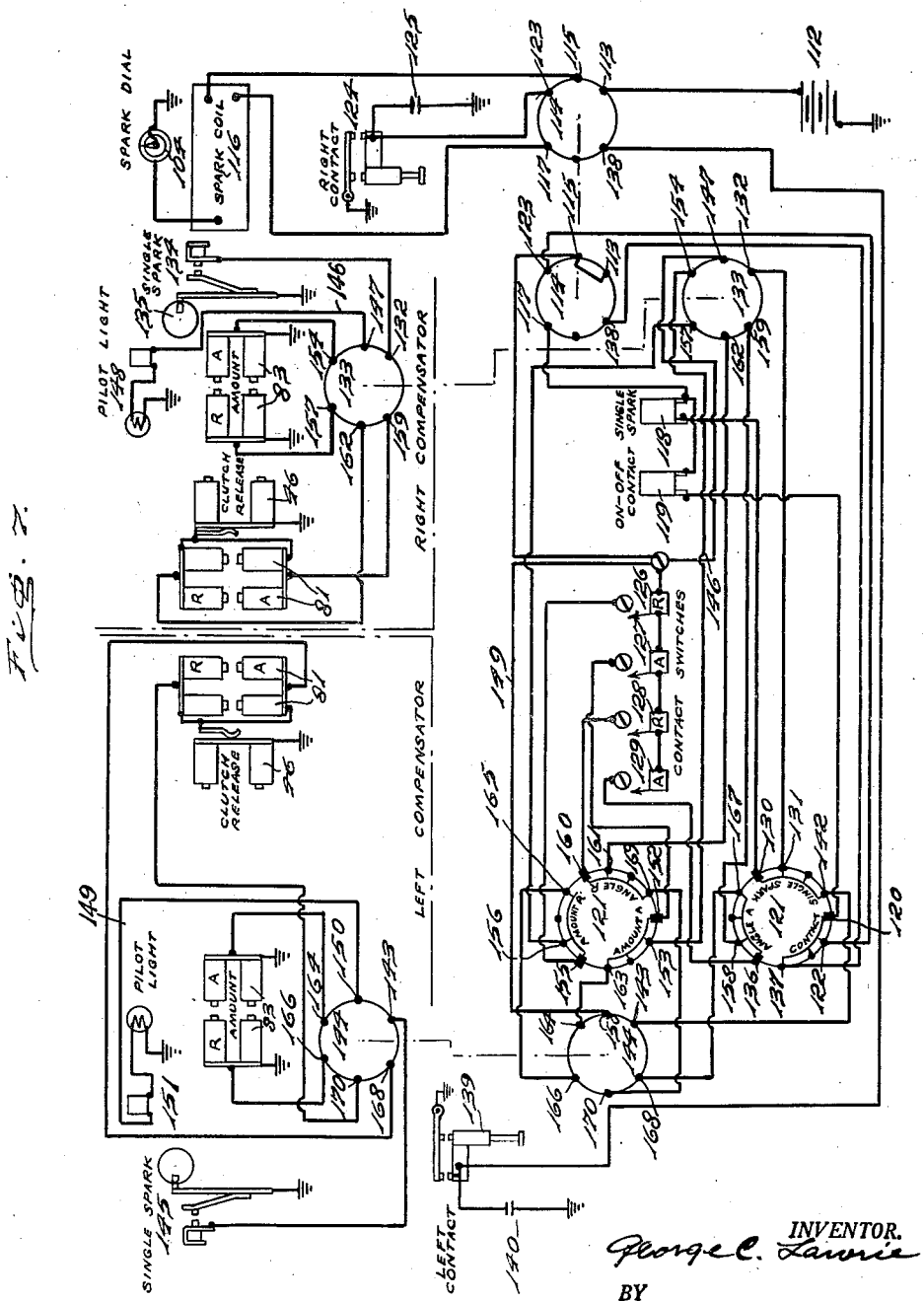

Patented Dec. 2, 1947

2,432,022

UNITED STATES PATENT OFFICE 2,432,022

BALANCING MACHINE

George C. Lawrie, Collingswood, N. J., assignor to Tinius Olsen Testing Machine Company, Philadelphia, Pa., a corporation of Pennsylvania Application November 21, 1944, Serial No. 564,435

9 Claims. (Cl. 73—66)

In the balancing of long specimens in a balancing machine where the vibratory support for the specimen is in the form of a cradle, there is considerable deflection of the cradle on which the specimen is being revolved.

I have found as a result of numerous experiments that a saving of time in the balancing operation and more accurate results can be obtained if two compensating devices are employed so that there is an independent compensating device for each plane of correction.

The main object, therefore, of this invention is to devise novel compensating mechanism of this character which is constructed and controlled in a novel manner.

With the foregoing and other objects in view as will hereinafter clearly appear, my invention comprehends a novel balancing machine and more particularly novel compensating mechanism.

Other novel features of construction and advantage will be set forth in the detailed description and the appended claims.

For the purpose of illustrating the invention, I have shown in the accompanying drawings a preferred embodiment of the invention which, in practice, will give satisfactory and reliable results. It is, however, to be understood that this embodiment is typical only and that the various instrumentalities of which the invention consists can be variously arranged and organized and the invention is not limited to the exact arrangement and organization of these instrumentalities as herein set forth.

Figure 3 is an end elevation.

Figure 4 is a vertical section of one of the compensators, the section being taken downwardly on line 4—4 of Figure 5.

Figure 5 is a front elevation of the compensator seen in Figure 4 with certain cooperating adjuncts.

Figure 6 is an end elevation of Figure 5 with a portion of the cradle in section.

Figure 7 is a wiring diagram.

Similar numerals of reference indicate corresponding parts.

Figure 1:
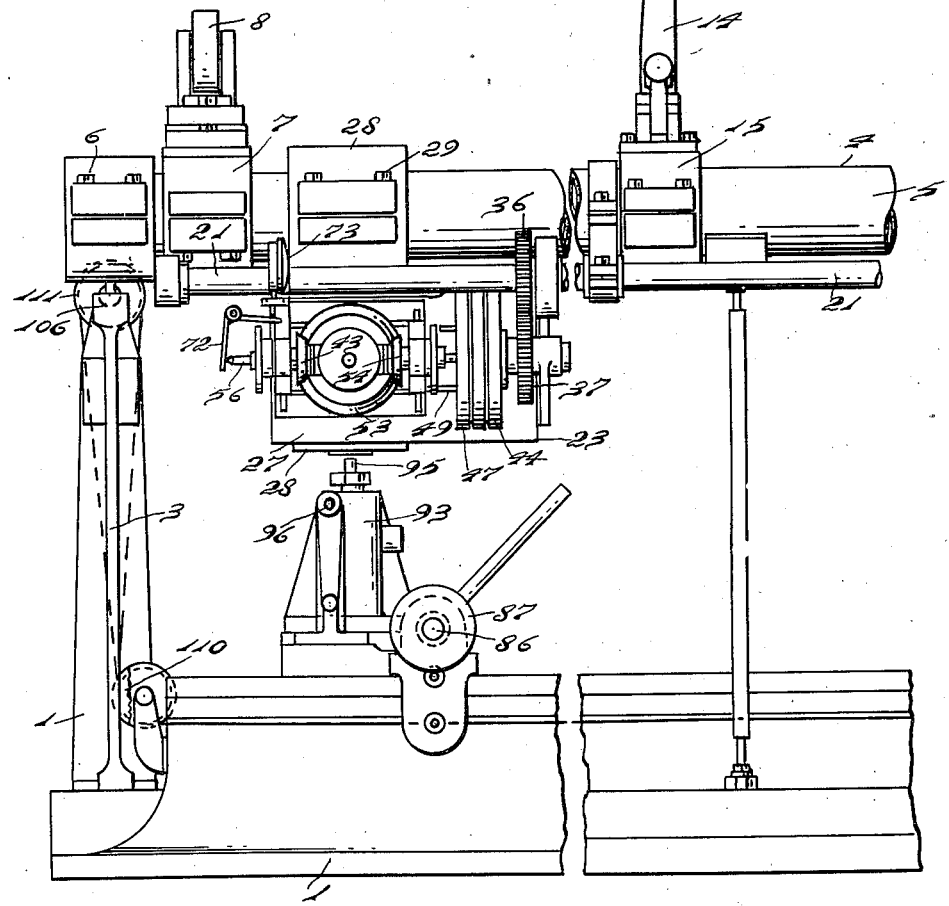
Figures 1 and 2 are a front elevation of a balancing machine, embodying my invention.

Referring to the drawings:

The general construction and operation of the balancing machine except for the dual compensator mechanism is of the Olsen compensating type placed on the market by the Tinius Olsen Testing Machine Company of Philadelphia, Pa. Since this type of balancing machine is now well known in the art, I have deemed it necessary to illustrate and describe the entire machine with only sufficient detail to enable one to clearly understand the construction and operation of the compensating mechanism and its cooperation in the balancing operation.

Figure 3:
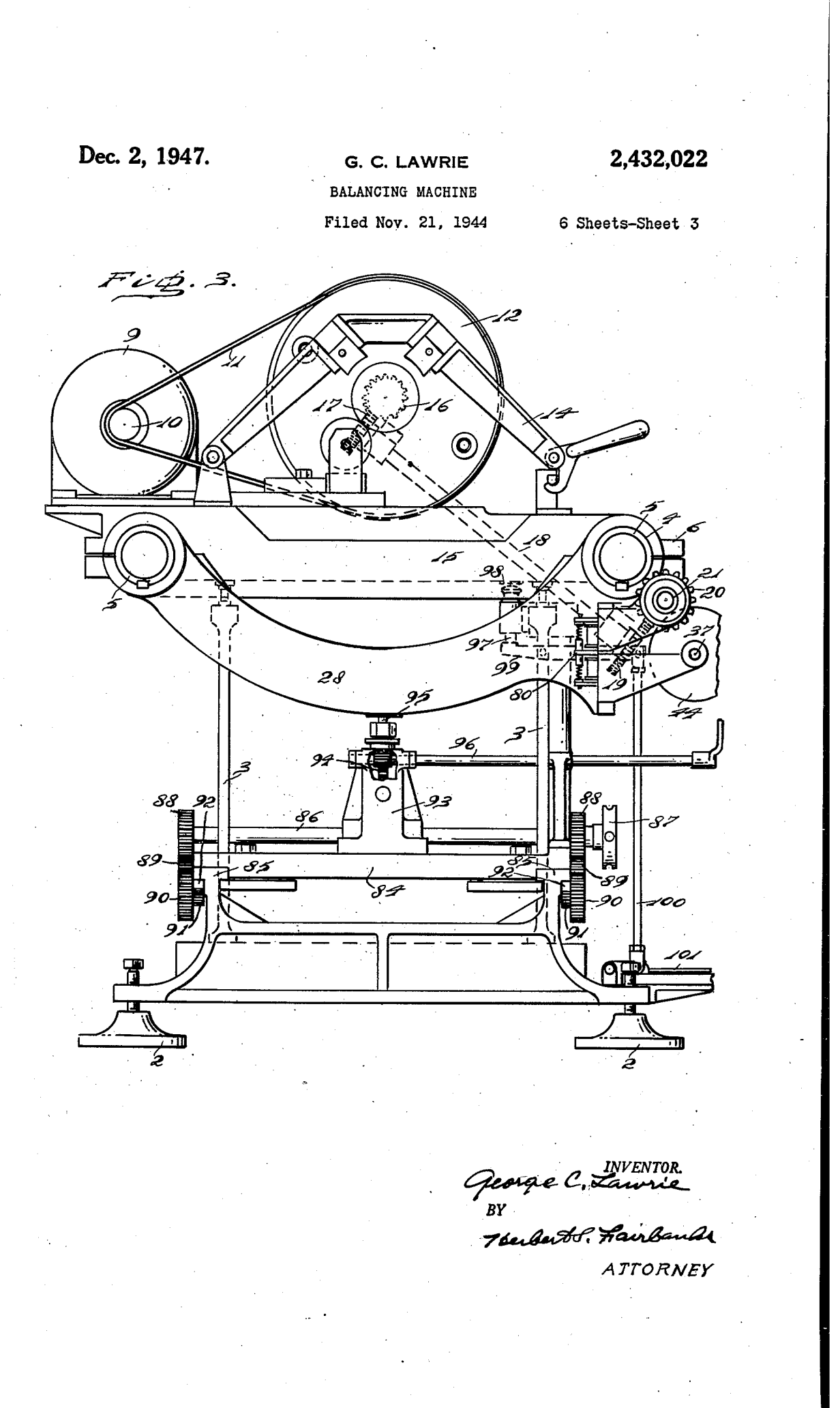

1 designates the frame of the balancing machine, and the base of the frame is provided with conventional levelling pads 2, see Figure 3.

Vibration members carried by and rising from the base as shown by 3 are connected at their upper ends to a vibratory support 4 in the form of a cradle having tubular side bars 5 connected by end cross bars 6. A desired number of cross bars 7 are longitudinally adjustable on the side bars 5 and carry rollers 8 on which the rotatable body to be tested for unbalance is mounted.

A motor 9, see Figure 3, drives a pulley 10 around which passes a belt 11 which also passes around a pulley 12, fixed to a main driving spindle 13, suitably journalled in the frame and adapted to be connected with the rotatable body to be tested in the conventional manner.

Due to the length of the cradle, a hold down mechanism 14 is preferably employed, such mechanism being mounted on a cross bar 15 longitudinally adjustable along the side bars of the cradle.

Figure 2:
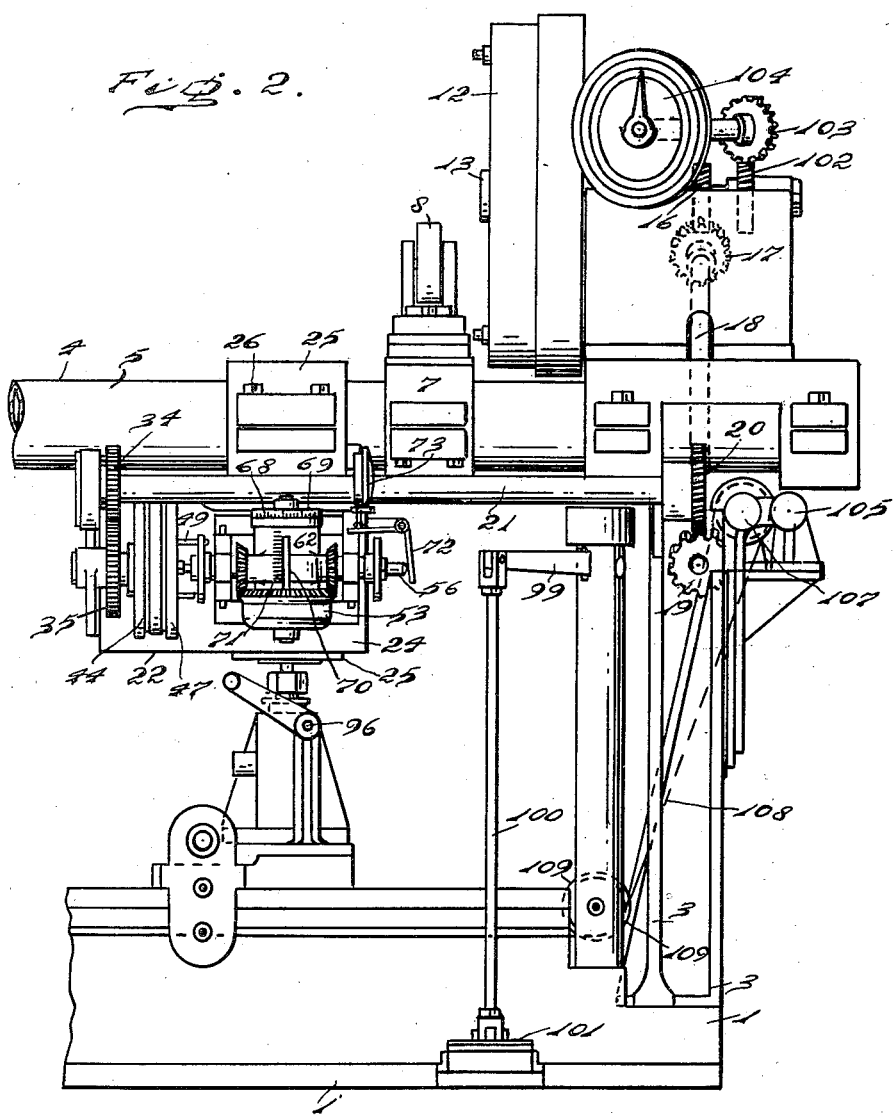

Referring to Figures 2 and 3, the driving spindle 13 has fixed to it a gear 16 which meshes with a gear 17 fixed on a shaft 18 journalled in the frame of the machine. The shaft 18 has fixed to it a gear 19 which meshes with a gear 20 fixed to a shaft 21, journalled in the frame. This shaft 21 drives the compensators 22 and 23 in synchronism with the rotation of the rotatable body being tested. The right compensator 22 has a frame 24 fixed to a cross bar 25 longitudinally adjustable on the side bars of the cradle and fixed in its adjusted position by fastening devices 26. In a similar manner, the compensator 23 has a frame 27 fixed to a cross bar 28 longitudinally adjustable on the side bars 5 of the cradle and fixed in its adjusted position by fastening devices 29. The cross bars 25 and 28 of the compensators are adjusted along the cradle in the same manner. A manually actuated handle 30, see Figure 6, is slidable into the hub of a gear 31 which meshes with a rack 32 fixed to a side bar 5 of the cradle. The gear 31 is mounted in the compensator cross bar. The handle 30 has a non-circular cross section which corresponds to that of an aperture 33 in the hub of the gear 31. The handle can be removed when not in use.

The compensators

Each compensator is of the same construction and a description of one of them is believed to be sufficient for a clear understanding of their construction and operation.

The right compensator 22 is driven by a gear 34 on the shaft 21 meshing with a gear 35 of the compensator 22. The gear 34 is splined to the shaft 21 and is movable as a unit with the right compensator when the latter is being positioned for a selected plane of correction. In a similar manner, the left compensator is driven by a gear 36 splined on the shaft 21, and meshing with a gear 37 of the left compensator.

Since the compensators are of identical construction, I will describe in detail only the right compensator.

The gear 35 is fixed to a shaft 37 having its outer end journalled in a bearing 38, see Fig. 4, on the frame 24, and at its inner end in a ball bearing 39 in the hub of a disc 40 fixed to a shaft 41 journalled in a ball bearing 42 carried by the compensator frame 24. A gear 43 is loosely mounted on the shaft 41.

A housing section 44 is fixed to the shaft 37 and has mounted in it coils 45 of electromagnets, the armatures 46 of which are mounted in a housing section 47 mounted on ball bearings 48 on the shaft 37. The section 47 has a driving pin 49 which extends into a slot 50 in the disc 40. 51 is a balancing pin. Springs 52 tend to move the armature away from the coils.

The gear 43 is a friction gear and engages a friction gear 53, see Figures 4 and 5, and the gear 53 engages a friction gear 54 on a bearing sleeve 55 in which a rod 56 is slidable. The inner end of the rod 56 has a wedge shaped key 57 cooperating with a keyway 58 in a balance weight 59 in threaded engagement with a shaft 60 mounted in ball bearings 61 in a casing 62 which is connected with and revolved by the shaft 41. One end of the shaft 60 passes through the gear 53 and is fixed thereto.

A yoke 63 is centered by spring pressed plungers 64, and has an armature 65 provided with a laterally extending slot 66 into which a pin 67 on the frame extends to prevent rotation of the yoke. The yoke 63 is fixed to the gears 43 and 54 so that they are stationary. A cap ring 68 is fixed on the shaft 60 and has graduations 69 on its periphery, see Fig. 2. The casing 62 has a slot 70 with graduations, coarser than the graduations 69, along the side of the slot.

The rod 56 bears against an angle lever 72 which actuates a dial indicator 73.

The sections of the electromagnet housing 44 and 47 have bearing faces 74 and 75 respectively of different diameters, which cooperate with an angle shifter.

The angle shifter

A shifter bracket 76 is mounted on a rod 77 on the compensator frame, see Fig. 4, and has rollers 78 and 79 to selectively engage the bearing faces 74 and 75, respectively. An armature 80 on the shifter bracket extends between a set of coils 81 and is centered by spring pressed plungers 82.

The yoke 63 is shifted to the right or left by sets of electromagnets 83 and thereby moves the gear 43 into or out of bearing engagement with the gear 53, and the gear 54 into and out of bearing engagement with the gear 53.

The pivot mechanism

A pivot carrying carriage 84 is slidable on ways 85 of the machine frame, see Fig. 3, and a shaft 86 journalled on the carriage has a wheel 87 for turning it. The shaft 85 has gears 88 meshing with gears 89 which in turn mesh with gears 90 to which are fixed pinions 91 meshing with racks 92 fixed to the ways 85.

The carriage 84 has a housing 93 in which is mounted a rack 94 which moves a pivot pin 95 into its locking or unlocking position with its cross bar 25 or 28. The rack is actuated by a manually controlled rod 96 geared to the rack 94.

Each compensator has its own pivot mechanism.

The vibration brake

In order to arrest more quickly the vibratory movement of the vibratory support, I provide a mechanical braking device.

A plunger 97, see Fig. 3, is moved against a plate 98 on a bracket portion of the vibratory support by a lever 99 connected with a link 100 actuated by a foot treadle 101.

The main driving spindle 13, see Fig. 2, has a gear 102 meshing with a gear 103 to drive a dial spark indicator 104.

At the headstock end of the machine is a conventional contact mechanism 105 mounted on the machine frame and causing a contact to engage a contact on the vibratory support as the support vibrates due to unbalance forces in the specimen being tested. A similar contact mechanism is provided at the tailstock end of the balancing machine as indicated at 106. In order to provide for the contact mechanism at the tailstock end of the machine being controlled at the headstock end, I provide a manually rotatable pulley 107 around which a wire 108 passes, said wire passing under pulleys 109 and 110, there being two of each of such pulleys, and around a pulley 111 on the left hand contact mechanism 106.

The wiring diagram

A source of electric supply 112, for example a six volt battery having one side grounded is connected with a terminal 113 of a two part plug 114. The terminal 113 is connected with a terminal 115 which is connected with a spark coil 116, the secondary of which is connected with the spark dial 104, one side of which is grounded. A terminal of the primary of the spark coil is connected with a terminal 117 of plug 114 and terminal 117 leads to a single spark switch 118. The single spark switch 118 is connected with an on and off switch forming a contact switch 119 which is connected with a terminal 120 of a rotatable switch 121. On turning switch 121 in a clockwise direction the terminal 120 connects with a terminal 122 connected with a terminal 123 of the plug 114. Terminal 123 is connected with the right contact mechanism 124 having a grounded condenser 125 which is shunted around the switch to prevent arcing.

For the right and left contact mechanisms, terminal 115 is connected with an amount removal switch 126, an amount to be added switch 127, an angle switch 128 for retarding the angle and an angle switch 129 for advancing the angle.

The single spark switch 118 is connected with a terminal 130 of the rotatable switch 121 which, on turning, connects terminal 130 with a terminal 131. The terminal 131 connects with a terminal 132 of a plug 133 made in two parts. The terminal 132 connects with the right, single spark mechanism 134 having a cam 135 of a commutator operating in the conventional manner well known in this art.

For the left contact mechanism, switch 119 is connected to a terminal 120 of switch 121, which is turned to connect terminal 120 with terminal 137 connected with terminal 138, which latter is connected with the left contact mechanism 139, having a grounded condenser 140.

For the single spark mechanism of the left compensator, the single spark switch 118 is connected with a terminal 130 of switch 121 which when turned connects terminal 130 with a terminal 142 connected with a terminal 143 of a two part plug 144. The terminal 143 is connected with the left, single spark mechanism 145.

Pilot circuits

A line 146 connects with a terminal 147 leading to right, pilot light 148.

For the left, pilot light, a line 149 leads to a terminal 150 connected with left, pilot light 151

Each pilot light has a manually actuated switch.

Amount circuits

For the right compensator, switch 127 connects with a terminal 152 connecting with a terminal 153 of the rotatable switch 121, then to a terminal 154 of switch 133 and the set of electromagnetic coils A of the right compensator and indicative of an amount to be added to the test specimen.

For an amount to be removed from the specimen, switch 126 is connected with terminal 155, terminal 156, terminal 157 of plug 133 and to coils R of the right compensator.

For advancing the angle for the right compensator, the switch 129 connects with terminal 136 of switch 121, which on being turned connects with a terminal 158, then terminal 159 of plug 133 and with coils A for advancing the angle.

For retarding the angle for the right compensator, the switch 128 connects with a terminal 160 which connects with a terminal 161 connected with a terminal 162, the latter being connected with coils R.

For amount of unbalance to be added for left compensator, the switch 127 connects with terminals 152, 163 and 164 and to coils A of left compensator.

For amount of unbalance to be removed for left compensator, the switch 126 connects with terminals 155, 165 and 166 and to coils R of left compensator.

For advance of angle for the left compensator, the switch 129 connects with terminals 136, 167 and 168 to coils A of angle shifter.

For retarding the angle for the left compensator, the switch 128 connects with terminals 160, 169 and 170 and to coils R of the angle shifter.

The operation

The operation of the balancing machine will now be clear to those skilled in this art and is as follows.

The body to be tested is placed on the rollers 8 of the vibratory support and connected with the driving spindle 13 in the usual manner and the motor 9 started. The cross bars 25 and 28 are adjusted along the side bars 5 to bring their compensators into the planes of correction of the body to be tested, and clamped in position by their fastening devices.

The pivot mechanism is moved into the planes of correction and the selected pivot locked with its cross bar.

Assuming that a test specimen is mounted on the vibratory support, the machine is running, and the left pivot is locked for use of the right compensator, the operator turns switch 121 to the first contact position in a clockwise direction. Switch 119 is closed and the right contact 124 adjusted to provide an arc of sparks on the spark dial 104 for approximately one third of the circumference. The single spark switch 118 is now closed and either switch 129 or 128 is closed to shift the single spark on the dial to a position opposite the arc of sparks. Switch 127 is next closed to add unbalance to the compensator until the spark disappears on the dial or, if right contact 124 is closed, a scattered spark occurs around the dial.

With the machine still running, the pivots are interchanged and switch 121 turned further clockwise to the last contact position, and the procedure is repeated for the left compensator.

When the unabalance for both planes of correction has been adjusted, the machine may be stopped and the unbalance for both planes is read from the compensator scales.

When the machine is running the readings can be taken from the dial indicators 73.

The operation of a compensating unit is as follows: When the switch 129 or 128 is closed, the magnets 46 of the clutch are energized at the same time as the magnets A or R of the coils 81, see Figure 6. This releases the friction clutch driving the compensator, and rollers 78 or 79, depending on whether switch 129 or 128 is closed, are forced in contact with driving and driven members of the clutch, which are of different diameters and act as a planetary drive, to shift the driven member relatively to the driving member.

When the single spark on the dial indicator is in position opposite to the arc of sparks, switch 129 or 128 is opened and the clutch reengages due to spring pressure and drives the compensator in synchronism with the work. Switch 129 is closed to add unbalance to the compensator, energizing one set of coils 83 which shifts the yoke 63 axially until gear 43 or 54 turns gear 53, thereby causing the screw or shaft 60 to turn and vary the position of the weight until the unbalance disappears.

The angle is shown on the spark dial while the machine is running, and the amount is shown on the dial indicator while the machine is running.

The broken lines in Figure 7 around the compensators indicate that the right and left compensators and their adjuncts are separate units of assembly.

Assuming that the right compensator has been used, its corresponding pivot is unlocked and the other pivot locked, and the same procedure is followed for the second plane of correction without disturbing the setting for the first plane, as regards to the compensator.

The operator can thus compensate for unbalance in two planes of correction without stopping the balancing machine and have the two readings for unbalance in the two planes of correction set up in the machine and can readily check from one reading to the other.

Having thus described my invention, what I claim as new and desire to secure by Letters Patent is:

1. In a balancing machine, a vibratory support for a test body comprising a cradle having side bars and cross bars longitudinally adjustable along the side bars, means to revolve a test body on said support, two unbalance compensators carried by said cross bars and intergeared with a side bar to be adjustable along said support to position them in planes of correction of the test body, means to drive said compensators, and means to selectively establish at a plane of correction a fixed pivot for vibratory movements of said support.

2. In a balancing machine, a vibratory support for a test body, means to revolve a test body on said support, two cross bars carried by and adjustable along said support to be positioned in planes of correction of the test body, an unbalance compensator carried by each cross bar to be positioned in a plane of correction, and a separate pivot mechanism for each cross bar to establish at a selected plane of correction a fixed pivot for vibratory movements of said support.

3. The construction specified in claim 2, wherein each compensator has means to adjust it to compensate for and indicate the angle and amount of unbalance of the test body at the plane of correction for which it has been adjusted.

4. In a balancing machine, a vibratory support for a test body, means to revolve a test body on said support, two cross bars adjustable along said support, an unbalance compensator carried by each cross bar, means to lock the cross bars with said support with the compensators in planes of correction of the test body, a separate pivot mechanism for each cross bar to establish at a selected plane of correction a fixed pivot for vibratory movements of said support, and means to drive said compensators from said revolving means.

5. In a balancing machine, a vibratory support for a test body having a cradle provided with side bars and cross bars adjustable along said side bars, means to revolve a test body on said support, two compensators carried by said cross bars and adjustable along the side bars to be positioned in planes of corrections of the test body, means to lock the compensators in such adjusted positions, a common drive for said compensators, and means to establish at a selected plane of correction a fixed pivot for vibratory movements of said support.

6. The construction set forth in claim 5 having in addition a spark dial mechanism, a right and a left contact mechanism to selectively create an arc of sparks on said dial mechanism due to unbalanced forces in the body under test, and means to selectively adjust a compensator during the revolution of the test body to compensate for unbalance in a selected plane of correction and to indicate the angle and amount of unbalance in such selected plane of the test body.

7. In a balancing machine, a support for a test body having side bars and cross bars adjustable along the side bars, vibration members supporting the ends of said support, means to revolve a test body on said vibratory support, two independent unbalance compensators carried by said cross bars and adjustable along said support between said vibration members, and driven by said revolving means, means to fix the compensators in two planes of correction of the test body, separate means to establish a fixed pivot for vibratory movements of said support at a selected plane of correction, and means to regulate the compensators to indicate the angle and amount of unbalance of the test body at the planes of correction for which they are compensating the unbalance.

8. In a balancing machine, a support for a test body having side bars and cross bars, vibration members supporting the ends of said support, means to revolve a test body on said support, two unbalance compensators fixed to said cross bars and longitudinally adjustable on the support, means to fix the compensators to the support at two planes of correction of the test body, separate means to establish a fixed pivot for one plane or the other of correction, means to regulate one unbalance compensator to indicate during the revolution of the test body the angle and amount of unbalance of the test body for the plane of which it is indicative, and means to regulate the other unbalance compensator, without changing the setting of the first unbalance compensator, to indicate during the revolution of the test body the angle and amount of unbalance for the other plane of correction of the test body.

9. In a balancing machine, a vibratory support for a test body having side bars and cross bars, a motor driven, driving spindle on said support to revolve a test body, two compensators carried by said cross bars adjustable on said support into planes of correction, means to fix the compensators in such planes of correction, a driving connection from said driving spindle to each of said compensators, separate means to establish a fixed pivot for vibratory movements of said support for each plane of correction, and means to regulate during the revolution of the test body each compensator to compensate for unbalance in the plane of correction of which it is indicative and to indicate the angle and amount of unbalance of the test body at each plane of correction.

GEORGE C. LAWRIE.

REFERENCES CITED

The following references are of record in the file of this patent:

UNITED STATES PATENTS

| Number | Name | Date |
| --- | --- | --- |
| 1,296,605 | Akimoff | Mar. 11, 1919 |
| 1,296,608 | Akimoff | Mar. 11, 1919 |
| 1,590,840 | Lundgren | June 29, 1926 |
| 1,625,259 | Johnson | Apr. 19, 1927 |
| 2,041,771 | Lundgren | May 26, 1936 |
| 2,046,294 | Lundgren | June 30, 1936 |
| 2,088,553 | Olsen | July 27, 1937 |
| 2,171,927 | Fuchs | Sept. 5, 1939 |
| 2,361,299 | Lawrie | Oct. 24, 1944 |

FOREIGN PATENTS

| Number | Country | Date |
| --- | --- | --- |
| 280,380 | Great Britain | Nov. 17, 1927 |
| 506,427 | Germany | Sept. 3, 1930 |
| 461,387 | Great Britain | Feb. 16, 1937 |